Nov. 29, 1955  J. R. OISHEI  2,724,854
WINDSHIELD WIPER
Filed Nov. 9, 1949
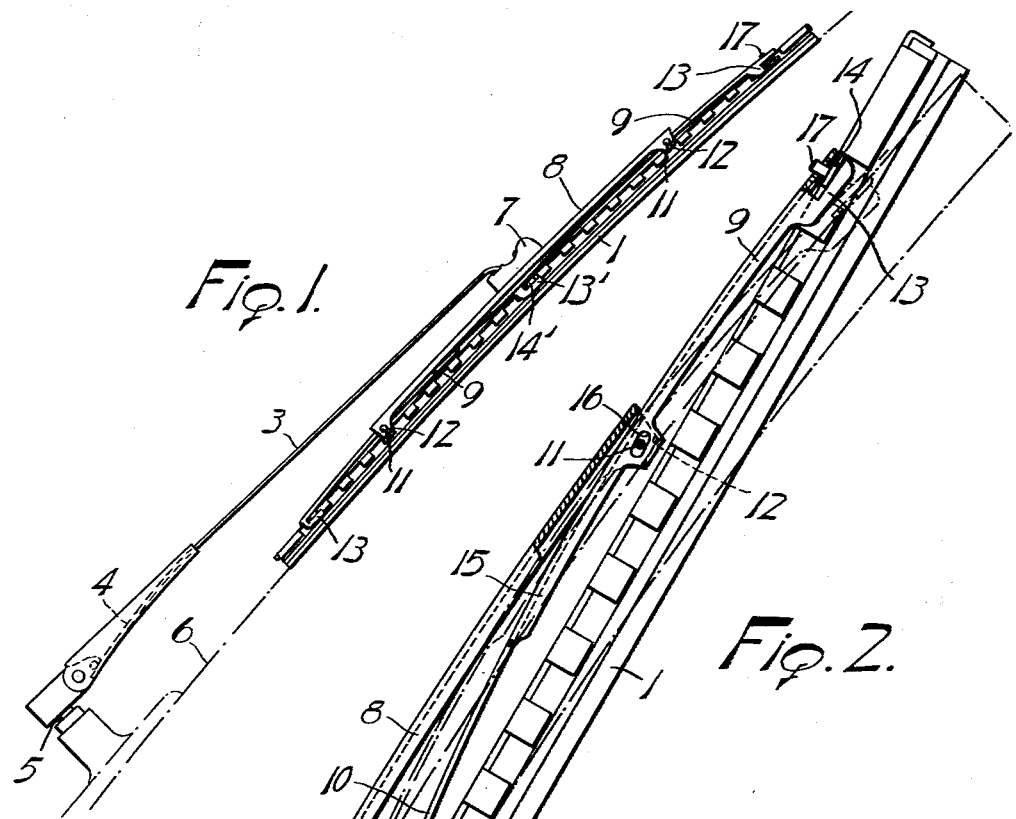
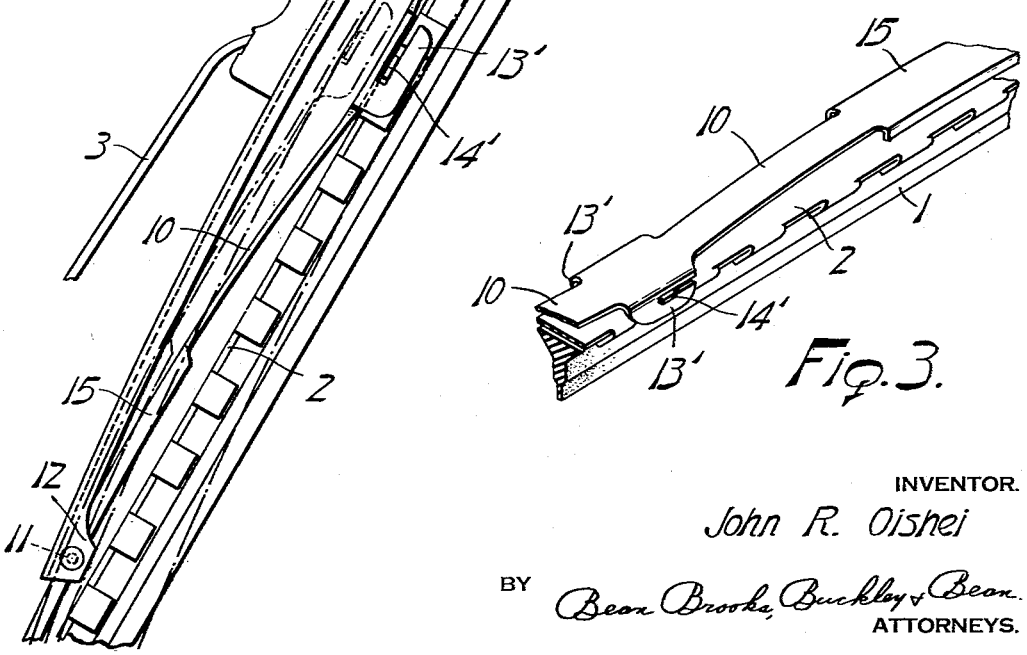
INVENTOR.
John R. Oishei
BY Bean Brooks, Buckley & Bean
ATTORNEYS.

United States Patent Office 2,724,854
Patented Nov. 29, 1955

2,724,854

WINDSHIELD WIPER

John R. Oishei, Buffalo, N. Y., assignor to Trico Products Corporation, Buffalo, N. Y.

Application November 9, 1949, Serial No. 126,330

12 Claims. (Cl. 15—245)

This invention relates to the field of windshield cleaners and has particular reference to the blade or wiper element which is moved back and forth on the windshield glass by an actuating arm. The actuating or wiper arm exerts a degree of spring urge upon the wiper for more effectively squeegeeing the moisture from the windshield surface and thereby to increase the visibility therethrough. Where the surface is curved the arm spring urge is distributed to the wiping edge at longitudinally spaced points through a flexible superstructure which latter serves to conform the wiping edge to changes in the surface contour.

The primary object and aim of this invention is to increase the cleaning efficiency of the wiper by providing a novel pressure distributing superstructure which will more effectively conform the wiping edge to contour changes in the surface being wiped.

A further object of the invention is to provide an improved pressure distributing superstructure by which the wiping edge is given resilient support to cushion its conformance to the surface contour changes.

The foregoing and other objects will manifest themselves as this description progresses, reference being made therein to the accompanying drawing, wherein Fig. 1 is a side elevation of the improved wiper as applied to a windshield surface;

Fig. 2 is a fragmentary view of the wiper, enlarged and having parts broken away for clarity of showing; and Fig. 3 is a detailed perspective view showing the spring frame more clearly.

Referring more particularly to the accompanying drawing, the numeral 1 designates the squeegee or elastic body of elongate design reinforced by a flexible backing 2 against lateral or lengthwise distention while encouraging flexure toward and from the glass for surface conformance. This squeegee body 1, together with its backing, is mounted as a unit on a superstructure which, in turn, is atached to the outer end of the wiper actuating arm 3 urged by a flat spring 4 in a well known manner to provide a predetermined pressure in the wiping contact on the glass. The arm is fixed on the oscillatory drive shaft 5 journaled at the lower side of the windshield 6.

The superstructure has an arm attaching device 7 and comprises an elongate bracket 8 and a spring frame, the latter including terminal sections or levers 9 and a connecting spring or cushioning section 10. Each lever 9 is fulcrumed on a respective end of the bracket, as by a pin 11 extending transversely between the lever straddling ears 12 on the bracket. The lever projects at one end beyond the bracket and is slidably interlocked with the squeegee unit, as by having a set of side hooks 13 on the lever straddle the backing and engaged beneath the lateral lugs 14 on the backing. The bracket may be of channeled form to nestingly receive the inner ends 15 of the terminal levers as well as their connecting spring 10. Likewise, the terminal levers may be channeled in cross section to give strength and stability to them for distributing the arm spring urge to the extreme outer ends of the squeegee unit, the channeled reinforcement extending throughout the inner ends 15 and inwardly of the fulcrum pins 11.

The lever-connecting flat spring section 10 is integral with and preferably forms a continuation of the bottom wall of the lever channels. Being devoid of side walls, the connecting spring 10 affords a resilient support for the inner ends of the unit carrying levers 9. Any lengthwise play of the levers may be provided for by enlarging the openings therein for the fulcrum pins 11, as indicated at 16. The intermediate portions of the spring may be tied to the intermediate portion of the squeegee unit to afford resilient support thereof. This is accomplished herein by forming the spring with unit straddling hooks 13' for slidably engaging beneath the lateral lugs 14' on the backing. This arrangement not only gives a cushioned suspension for the squeegee unit but also serves to divide the spring action, affording each terminal lever an individual portion thereof between the inner end 15 and the anchor 13', 14'. The cushioned support is thereby provided for the three points of mounting attachment as defined by the cooperating hooks and lugs.

One set of terminal hooks 13 may face in the opposite direction from the set on the opposite end of the spring frame and assembled on the squeegee unit prior to placement of the fulcrum pins 11, which latter may be detachable, or the three sets of hooks may extend in the same direction and means provided to secure the spring frame and the squeegee unit against relative longitudinal movement. Such means is herein depicted as being in the form of a spring detent 17 carried by the backing 2 and resiliently engaging in an aperture in the overlying portion of one of the terminal levers.

The spring frame 9, 10 being attached to the squeegee unit in the above manner provides three points of cushioned support for the unit with the spring section 10 resiliently restraining the levers against rocking. The spring is free to flex from the innermost tip of the inner end 15 and therefore when either lever rocks on its fulcrum its inner end will be deflected against the spring urge. The spring frame may be economically manufactured as a stamping and serves to resiliently distribute the arm pressure to the squeegee unit in holding the wiping edge upon the glass.

While the foregoing description has been given in detail it is without thought of limitation since the inventive principles involved are capable of assuming other physical embodiments without departing from the spirit of the invention and the scope of the appended claims.

What is claimed is:

1. A windshield wiper comprising an elongate flexible body having a flexible backing strip with three longitudinally spaced mounting parts, and a pressure distributing superstructure having an elongate bracket and an elongate spring frame consisting of integral opposed rigid terminal sections rockably attached to the opposite ends of the bracket and a flat intermediate spring section resiliently and integrally connecting said terminal sections to place them under a spring urge to hold them in a normal position, the three sections each connected to the first mounting parts to provide a resilient support for the backing strip.

2. A windshield wiper comprising an elongate body having a flexible reinforcing member, a pressure distributing superstructure having an elongate bracket and an elongate spring frame having rigid terminal portions constituting longitudinally spaced levers and mounted on the opposite ends of the bracket for rocking about transverse axes, said levers having rigid end portions inwardly and outwardly of the axes with their inner ends joined by an intermediate spring portion in the form of a flat spring strip to hold the terminal portions operative while permitting independent rocking of either, and means connecting the remote ends of the terminal portions and the intermediate spring portion to the reinforcing member.

3. A windshield wiper comprising a squeegee unit, an elongate pressure distributing bracket having an arm attaching means, and an elongate spring frame arranged under the bracket and having longitudinally spaced rigid levers fulcrumed on the opposite ends of the bracket and joined together at their inner ends by a downwardly bowed spring for biasing their outer ends downwardly from the bracket, with means connecting the unit at longitudinally spaced points to the remote ends of the lever and to the bowed portion of the spring for yielding support.

4. A windshield wiper comprising an elongate body having a flexible backing strip, a pressure distributing superstructure having an elongate bracket and a spring strip having its opposite end portions reinforced against flexing to form longitudinally spaced levers joined by an intermediate resiliently yieldable portion, said levers rockably supported by the opposite ends of the bracket, and means detachably connecting the remote end of the levers and the intermediate yieldable portion to the backing strip.

5. A windshield wiper comprising an elongate body having a flexible backing strip means forming a squeegee unit therewith, an elongate pressure distributing bracket, and a spring frame, said frame having inflexible opposite terminals and a connecting intermediate spring portion, the latter being bowed toward the unit and with the remote ends of the terminals affording three longitudinally spaced cushioned points of support, the inflexible terminals being rockably mounted respectively on the opposite ends of the bracket, and means operatively supporting the strip means on the bowed spring portion and on said remote ends.

6. A windshield wiper comprising a squeegee unit, a resilient pressure distributing superstructure having an elongate bracket, a rigid lever member for each end of the latter extending lengthwise thereof and itself being pivotally connected intermediate its ends to the respective bracket end for rocking about a transverse axis, the outer ends of the lever members being connected to the squeegee unit, and a dual functioning bowed spring means integrally connecting the inner ends of the lever members to permit individual yielding movements of the levers and to provide a resilient bipedal support for the squeegee unit.

7. A windshield wiper comprising an elongate body having a flexible backing strip, a pressure distributing frame having an elongate bracket with lever members for each of the bracket ends extending lengthwise thereof and being rockably connected thereto, the outer ends of the lever members being slidably interlocked with the backing strip, and a flat spring resiliently joining the inner ends of the lever members together and providing an intermediate support for the unit.

8. A windshield wiper comprising a wiping unit having an elongate flexible body and a flexible backing strip, a pressure distributing frame having an elongate bracket with a lever member for each end thereof rockable thereon about a transverse axis and extending lengthwise thereof, the outer ends of the lever members being connected to the backing strip, and a flat spring joining the inner ends of the lever members inwardly of the axes and bowed downwardly from the intermediate portion of the bracket into supporting contact with the wiping unit to provide a cushioned support for the intermediate portion thereof.

9. A wiper for curved windshields, comprising a squeegee unit, a resilient pressure distributing superstructure having an elongate bracket, a rigid lever member for each end of the latter pivotally connected intermediate its ends to the respective bracket end for rocking about a transverse axis and constituting a longitudinal extension of the bracket, the outer ends of the lever members being connected to the squeegee unit, and bowed spring means integrally connected to the inner end of each lever member to resiliently hold the latter in normal position while permitting independent rocking and thereby yieldably support the squeegee unit.

10. A windshield wiper comprising an elongate body having a flexible backing strip, a pressure distributing frame having an elongate channeled bracket with a lever member arranged in the bracket channel for rocking and projecting therefrom to provide an extension of the bracket, the outer end of the lever member and the opposite end of the frame being connected to the backing strip, and a flat spring integrally connected to the inner end of the lever member and movable therewith in the bracket channel in providing an independently yieldable support for the unit.

11. A windshield wiper comprising an elongate body having a flexible backing strip, a pressure distributing frame having an elongate bracket, means connecting one end of said bracket with said backing strip, a lever member extending lengthwise of said bracket and being rockably connected intermediate its ends to the opposite end of said bracket, said lever member having its outer end connected to said flexible backing strip, and spring means integrally secured to the inner end of said lever member and inwardly thereof having connection to said flexible backing strip to provide resilient support for the latter and to maintain said lever member in independently yieldable normal position.

12. A windshield wiper comprising an elongate body having a flexible backing strip, a pressure distributing frame having an elongate bracket, one end of said bracket being connected to said flexible backing strip, said frame also having a lever member rockably connected by means of a lost motion pivotal connection to the opposite end of said bracket and extending lengthwise thereof, the outer end of the lever member being slidably interlocked with the backing strip, and a flat spring integrally connected to the inner end of said lever member and extending inwardly thereof, the inner end of said spring being connected to said flexible backing strip to provide together with said lever member a resilient bipedal support for the flexible backing strip.

References Cited in the file of this patent

UNITED STATES PATENTS

| 1,169,280 | Ousley | Jan. 25, 1916 |
| 1,463,590 | Pederson | July 31, 1923 |
| 2,548,090 | Anderson | Aug. 10, 1951 |

OTHER REFERENCES

Publication of Anderson Company, "Windshield Wipers," (c) 1946, pages 2 and 3.